(12) United States Patent
Takenaka

(10) Patent No.: US 7,428,016 B2
(45) Date of Patent: Sep. 23, 2008

(54) PHONE CAMERA WITH FLASH AND INDICATION LIGHT SHARING COMMON OUTPUT

(75) Inventor: Hidetoshi Takenaka, Saitama (JP)

(73) Assignee: NEC Corporation, Tokyo (JP)

( * ) Notice: Subject to any disclaimer, the term of this patent is extended or adjusted under 35 U.S.C. 154(b) by 758 days.

(21) Appl. No.: 10/819,930

(22) Filed: Apr. 8, 2004

(65) Prior Publication Data

US 2004/0207749 A1 Oct. 21, 2004

(30) Foreign Application Priority Data

Apr. 17, 2003 (JP) .............................. 2003-113431

(51) Int. Cl.
*H04N 5/222* (2006.01)
(52) U.S. Cl. ...................... 348/371; 348/374
(58) Field of Classification Search ................ 348/371, 348/370; 359/718; 362/227, 257, 317, 234
See application file for complete search history.

(56) References Cited

U.S. PATENT DOCUMENTS

| 5,211,463 | A | * | 5/1993 | Kalmanash | ................... | 362/26 |
| 6,104,455 | A | * | 8/2000 | Kashima | ....................... | 349/65 |
| 6,504,179 | B1 | * | 1/2003 | Ellens et al. | ................... | 257/88 |
| 7,136,672 | B2 | * | 11/2006 | Kitano et al. | ............ | 455/556.1 |
| 2001/0053703 | A1 | | 12/2001 | Kobayashi | | |
| 2002/0155855 | A1 | * | 10/2002 | Lee et al. | .................... | 455/550 |

FOREIGN PATENT DOCUMENTS

| CN | 1224522 A | 7/1999 |
| DE | 199 47 612 | 4/2000 |
| EP | 1 109 147 | 6/2001 |
| EP | 1 211 869 | 6/2002 |
| JP | 56-152249 | 11/1981 |
| JP | 6-88993 | 3/1994 |
| JP | 08-069042 | 3/1996 |
| JP | 10-119353 | 5/1998 |
| JP | 10-171005 | 6/1998 |
| JP | 10-206942 | 8/1998 |
| JP | 10-274947 | 10/1998 |
| JP | 11-133490 | 5/1999 |

(Continued)

OTHER PUBLICATIONS

European Search Report dated Dec. 1, 2004.

(Continued)

*Primary Examiner*—NgocYen T. Vu
*Assistant Examiner*—Nicholas G Giles
(74) *Attorney, Agent, or Firm*—Dickstein Shapiro LLP

(57) ABSTRACT

A portable electronic device with a camera of the present invention comprises a camera portion, a first light source outputting a first light as a strobe light emitting operation in connection with a photographing operation of the camera portion, a second light source outputting a second light for display and an illumination lens through which the first light and the second light exit the device. The illumination lens outputs both of the first light and the second light. A light diffuser, such as a prism reflects the second light to the illumination lens side between the illumination lens and the first light source, the second light reaching the first light source having been made as small as negligible.

6 Claims, 6 Drawing Sheets

FOREIGN PATENT DOCUMENTS

| | | |
|---|---|---|
| JP | 2000-89318 | 3/2000 |
| JP | 2002-207236 | 7/2002 |
| JP | 2002-208236 | 7/2002 |
| JP | 2002-300251 | 10/2002 |
| JP | 2002-320001 | 10/2002 |
| JP | 2002-374339 | 12/2002 |
| JP | 2003-84341 | 3/2003 |
| JP | 2003-087376 | 3/2003 |
| JP | 2003-204468 | 7/2003 |
| JP | 2003-333155 | 11/2003 |
| JP | 2004-048469 | 2/2004 |
| JP | 2004-252469 | 9/2004 |
| WO | WO-01/05125 | 1/2001 |
| WO | WO02/43151 | 5/2002 |

OTHER PUBLICATIONS

English translation of relevant portions of Japanese office action issued Jul. 12, 2004.

English translation of relevant portions of Japanese office action issued Oct. 11, 2005.

Chinese Office Action issued Jan. 6, 2006.

Japanese Office Action issued Feb. 28, 2006 (w/ English translation of relevant portions).

* cited by examiner

PHONE CAMERA WITH FLASH AND INDICATION LIGHT SHARING COMMON OUTPUT

BACKGROUND OF THE INVENTION

1. Field of the Invention

The present invention relates to a portable electronic device with a camera, and particularly to a portable electronic device with a camera having a light emitting element being used in illumination for camera-photographing and a light emitting element for emitting light at the time of being called or calling.

2. Description of the Prior Art

In recent years, a mobile telephone as a portable electronic device has been made more multi-functional and particularly a mobile telephone equipped with a digital camera has been widespread. And a mobile telephone of this type is often provided with a light emitting portion for display which blinks to notify a user of an incoming call or makes an emblem perform an illumination display in various colors during conversation. Further, recently a mobile telephone 101 equipped with a strobe light emitting portion to output a flash light for photographing as shown in FIG. 1 has been proposed.

As shown in FIG. 1, a mobile telephone 101 is provided with a foldable case 102. And an upper case 103 is provided with an electronic camera unit having a camera lens 104 for photographing, a strobe light emitting portion 105, an illumination display portion 106, an auxiliary display portion 107 and an antenna 108 for transmission or reception. The illumination display portion 106 performs incoming indication for notifying a user of an incoming call or performs illumination display during conversation. The auxiliary display portion 107 enables a user to visually recognize the display screen in a folded state.

As shown in FIG. 2, the illumination display portion 106 comprises a blue LED unit 108 mounted on a printed wiring board 107, a display illumination lens 109 and a light shielding holder 110. The light shielding holder 110 holds the illumination lens 109 aligned in position and leads light emitted from the blue LED unit 108 to the illumination lens 109 without leakage.

And although up to now a strobe light source for making a xenon (Xe) discharge tube emit light has been generally used as a light source of the strobe light emitting portion 105, for reduction in size and cost a light source using a white LED as disclosed in Japanese Patent Laid-Open Publication No. 2002-207,236 is proposed. FIG. 3 is a sectional view of a strobe light emitting portion 105 using a white LED as a light source. As shown in FIG. 3, the strobe light emitting portion 105 has a white LED unit 111 mounted on a printed wiring board 107, a strobe light emission lens 112 and a light shielding holder 113. The light shielding holder 113 holds the strobe light emission lens 112 aligned in position and leads light emitted from the white LED unit 111 to the strobe light emission lens 112 without leakage.

An example of the white LED unit 111 is disclosed in Japanese Patent Laid-Open Publication No. Hei 10-274,947. The white LED unit in this publication is provided with a fluorescent plate mixed with a fluorescent material to emit a yellow light by a blue light and a prism sheet between it and a blue LED. This prism sheet makes uniform and outputs light emitted from the blue LED to the fluorescent plate.

However, since a conventional mobile telephone 101 as described above is provided with a display illumination portion 106 and a strobe light emitting portion 105 independently of each other at separate locations, it has been difficult to be made small in size, light in weight and low in cost.

SUMMARY OF THE INVENTION

The present invention has been performed in consideration of the above-mentioned situation and aims at providing a portable electronic device with a camera capable of being made small in size, light in weight and low in cost as realizing multi-functionality.

In order to solve the above problem, a portable electronic device with a camera of the present invention comprises a camera portion, a first light source for outputting a first light as a strobe light emitting operation in connection with a photographing operation of the camera portion and a second light source for outputting a second light for display, the first light and the second light being outputted from the same opening to the outside.

And a portable electronic device with a camera of the present invention comprises a camera portion, a first light source for outputting a first light as a strobe light emitting operation in connection with a photographing operation of the camera portion and a second light source for outputting a second light for display, the first light and the second light being outputted through a common optical system to the outside.

The second light source of a portable electronic device with a camera of the present invention is used to output the second light as incoming indication or as illumination display during conversation.

The optical system of the portable electronic device with a camera of the present invention comprises a lens and the lens provided with a first entrance face through which the first light comes in, a second entrance face through which the second light comes in and a common exit face through which the first light and the second light exit. One entrance face of these entrance faces is provided on the opposite face to the common exit face and the other entrance face is provided on a side face adjacent to the common exit face and the opposite face. And the optical system can be provided with a light diffusing means such as a prism sheet or a diffusing sheet being in contact with or close to an entrance face at the side where a first light source is arranged, the entrance face being one of the first and the second entrance faces of the lens. This light diffusing means has a function of reflecting a second light for display outputted from the second light source to the lens side of the optical system and thereby suppressing the entrance of light outputted from the second light source into the first light source.

A light emitting diode is used as each of the first light source and the second light source of a portable electronic device with a camera of the present invention, and a white light emitting diode can be used as the first light source and a blue light emitting diode or the like can be used as the second light source.

According to a portable electronic device with a camera of the present invention, by outputting a first light outputted from a first light source and a second light outputted from a second light source through the same opening provided in a case, it is possible to reduce the accommodating space in the case as realizing multi-functionality including a strobe light emitting function and a display function. For example, by sharing an optical lens arranged at the opening, it is made unnecessary to provide separate lenses for illumination display and for strobe light emission as in the prior art. Therefore the present invention provides a mobile telephone and the like suppressing the increase in number of parts and being multifunctional, small in size, light in weight and low in cost.

And in a portable electronic device with a camera of the present invention, a light diffusing means such as a prism sheet, a diffusing sheet or the like is interposed between a lens and a first light source. Due to this light diffusing means, a second light reaching a first light source from a second light source side is made as small as negligible. In a portable electronic device with a camera of the present invention, therefore, in case of forming a first light source by combining a blue light emitting diode and a yellow fluorescent material with each other and of using a blue diode as a second light source, it is possible to suppress the emission of a white light being unwanted in display quality.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Embodiments of a portable electronic device with a camera of the present invention are concretely described taking a mobile telephone as an example.

Figure 1:
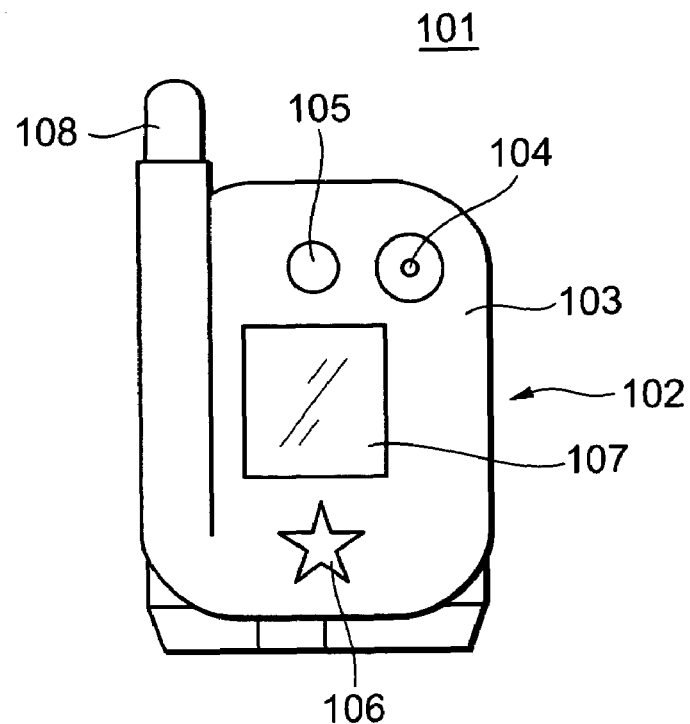
FIG. 1 is an external view of a conventional mobile telephone.
Figure 2:
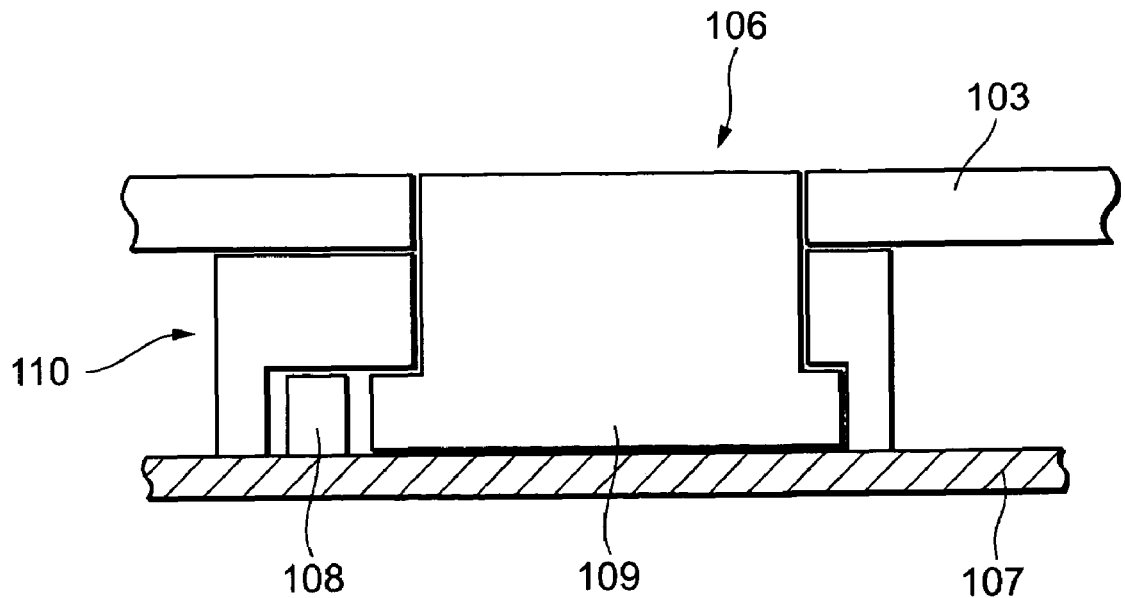
FIG. 2 is a sectional view showing a structural example of a display illumination portion of a conventional mobile telephone.
Figure 3:
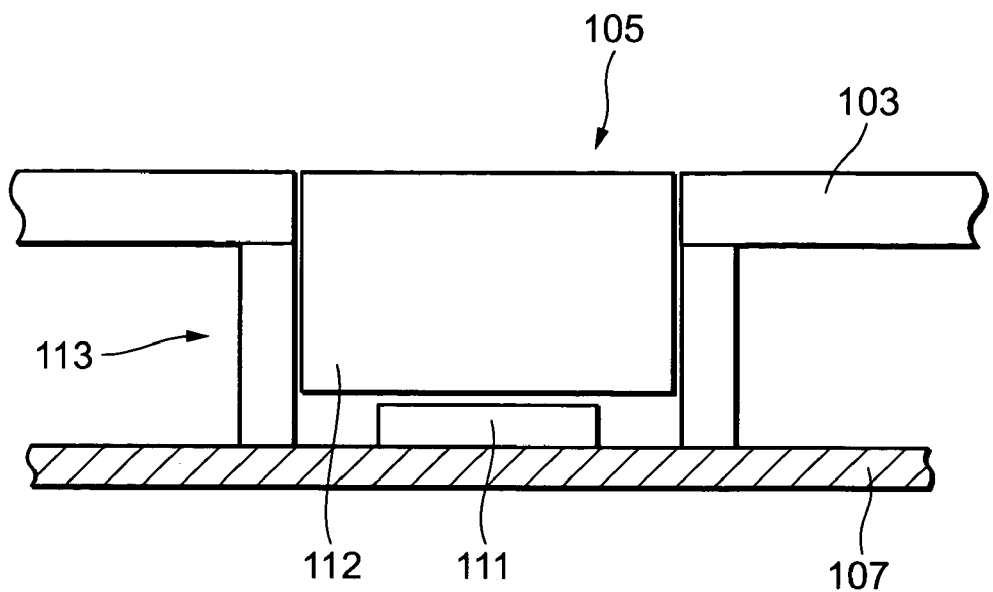
FIG. 3 is a sectional view showing the structure of a strobe light emitting portion of a conventional mobile telephone.
Figure 4:
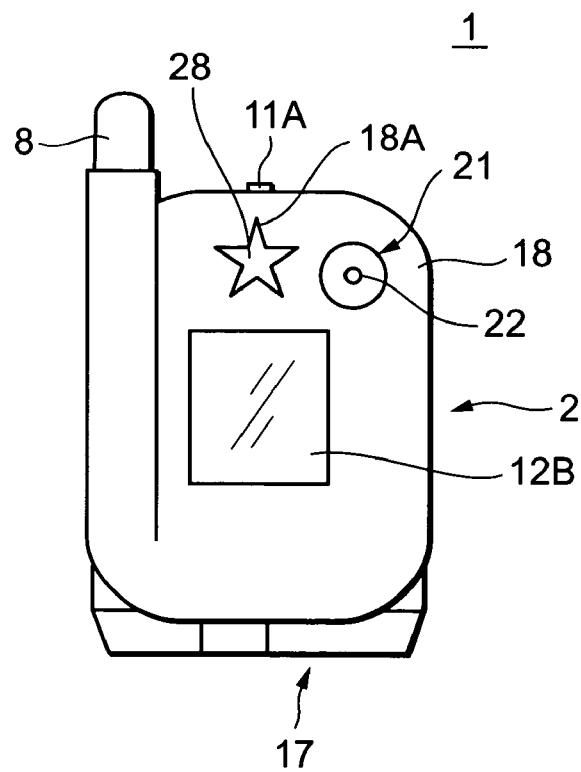
FIG. 4 is a external view of a foldable-type mobile telephone being an embodiment of the present invention.

FIG. 4 is an external view of a mobile telephone being an embodiment of the present invention. As shown in FIG. 4, a mobile telephone 1 of the present invention is provided with a foldable case 2, intrinsic conversation and data communication functions and additionally a photographing function by a built-in electronic camera.

Figure 6:
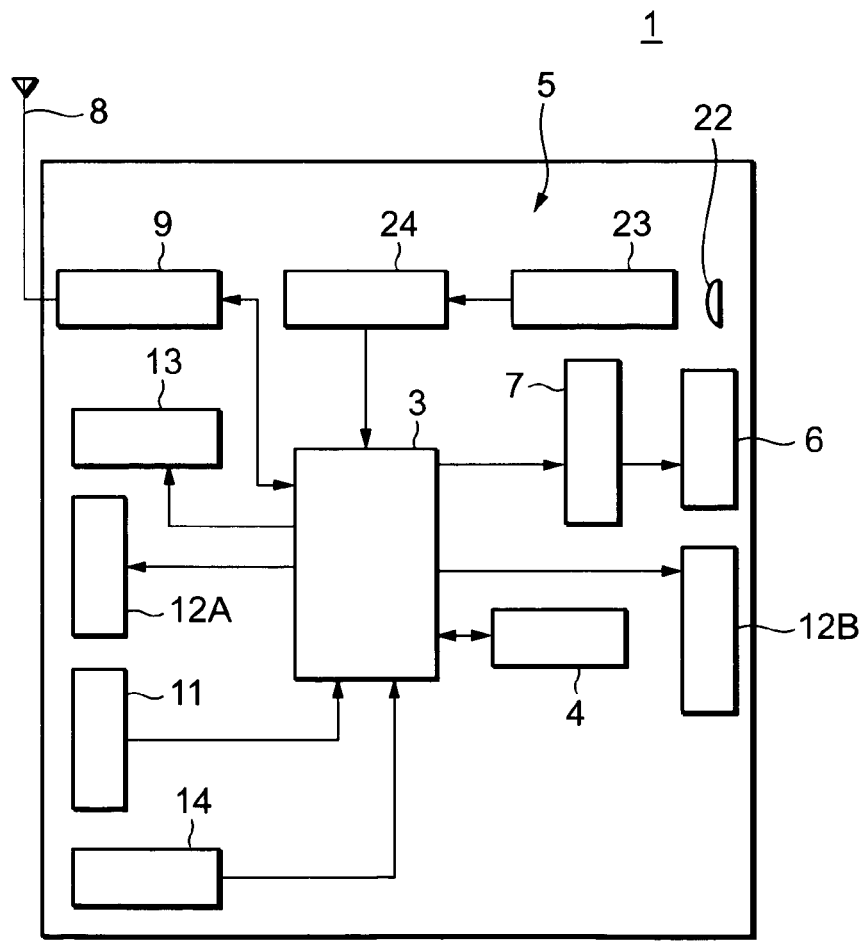
FIG. 6 is a compositional block diagram of the mobile telephone of FIG. 4.

FIG. 6 shows a compositional block diagram of the mobile telephone 1 of FIG. 4. As shown in FIG. 6, the mobile telephone 1 is provided with a control portion 3 for controlling the respective components of the mobile telephone main body, a storage portion 4, an electronic camera unit 5, a light emitting portion 6 having a strobe light emitting function and an incoming illumination function, and an LED driving function 7. The storage portion 4 stores a processing program to be executed by the control portion 3, various kinds of data and the like in it.

Further, the mobile telephone 1 of the present invention comprises an antenna 8, a wireless communication portion 9, an operation portion 11 composed of various kinds of operation keys and the like, a main display portion 12A, an auxiliary display portion 12B, a speaker 13 and a microphone 14. The main display portion 12A and the auxiliary display portion 12B each are composed of a liquid crystal display device.

As shown in FIG. 4, the case 2 is composed of an upper case 18 and a lower case joined to each other by a hinge portion 17. The hinge portion 17 joins the upper case 18 and the lower case with each other so as to be freely turned and thereby makes the mobile telephone 1 foldable.

The control portion 3 controls a display control program for making the main display portion 12A and the auxiliary display portion 12B display image data obtained by the electronic camera unit 5 for example. And the control portion 3 executes a light emitting control program for controlling the LED driving portion 7 to emit a strobe light at the time of photographing or for blinking the blue LED unit at the time of being called. Various processing programs such as a home page browsing program, an electronic mail preparing, transmitting and receiving program and the like stored in the storage portion 4 are also executed by the control portion 3.

The storage portion 4 is composed of semiconductor memories such as ROM, RAM and the like. In this storage portion 4, various information and the like such as a display control program, a light emitting control program, received information, image data and the like are stored, and various kinds of registers and flags to be used when the control portion 3 executes programs are secured.

The electronic camera unit 5 is provided in the outside face of the upper case 18, as shown in FIG. 4 and FIG. 6. And the electronic camera unit 5 has a photographing window 21, a camera lens 22 arranged in the vicinity of the photographing window 21, an image pick-up device 23 for outputting an image signal and an image processing portion 24. As the camera lens 22, for example, a standard lens is used. The image pick-up device 23 is composed of a CCD imaging device and the like. The image processing portion 24 performs such image processing as a gamma conversion, a color space conversion and the like on a signal digitized by A/D-converting an image signal sent from the image pick-up device 23.

The light emitting portion 6 has an incoming notification function of notifying a user of an incoming call, an illumination display function of performing illumination display of a specific emblem and a strobe light emitting function of emitting a strobe light according to necessity at the time of photographing.

Figure 5:
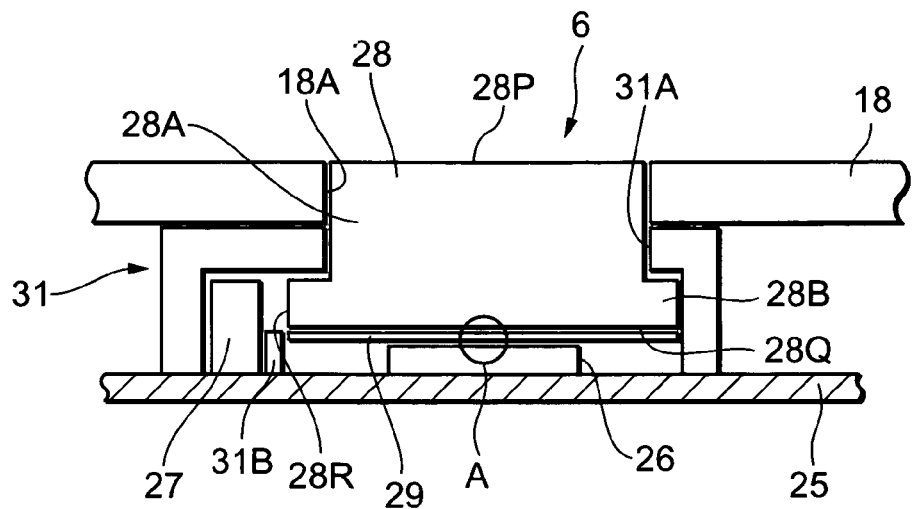
FIG. 5 is a sectional view showing the structure of a light emitting portion of the mobile telephone of FIG. 4.

As shown in FIG. 5, the light emitting portion 6 has a white LED unit 26 (a first light source) and a blue LED unit 27 (a second light source) mounted on a printed wiring board 25, an illumination lens 28, a prism sheet 29 and a light shielding sheet 31. The prism sheet 29 (light diffusing means) is arranged between the white LED unit 26 and the illumination lens 28, transmits light emitted from the white LED unit 26 and reflects light coming from the blue LED unit 27. The light shielding holder 31 holds the illumination lens 28 and leads light emitted from the white LED unit 26 or the blue LED unit 27 to the illumination lens 28 without leakage.

The white LED unit 26 comprises, for example, a plurality of blue LED's and a fluorescent plate mixed with a fluorescent material emitting a yellow light by a blue light emitted from a blue LED, and is used to obtain a flash light (strobe light) according to necessity at the time of photographing.

The blue LED unit 27 has a plurality of blue LED's and is used for performing illumination display of an emblem at the time of incoming notification or conversation.

The illumination lens 28 is fitted at its top end portion 28A into an opening 18A formed in the upper case 18 and an opening 31A formed in the light shielding holder 31. Further, the illumination lens 28 is aligned in position and fixed in a state where its top face is exposed from the opening 18A by engaging the upper face of a flange portion 28B protruded in the periphery of the lower face with the edge of the opening 31A. The shape of the opening 18A is made into a shape corresponding to a specific emblem.

And the illumination lens 28 is arranged so as to lead a white light and a blue light to the outside of the upper case 18, and has an exit face 28P (common exit face) for outputting a white light and a blue light to the outside and has an entrance face 28Q through which a white light comes in and a side face 28R through which a blue light comes in at the side being opposite to the exit face 28P.

Figure 7:
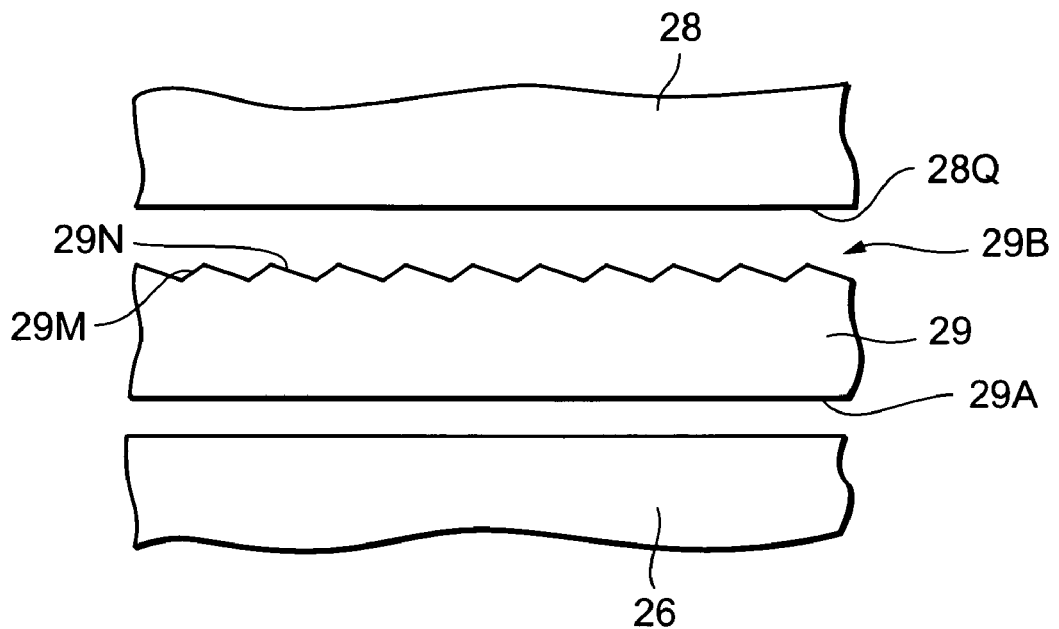
FIG. 7 is a magnified sectional view of part A of FIG. 5.

The prism sheet 29 is formed out of a sheet-shaped member being made of, for example, acrylic-based resin, being optically transmittable and having a rectangular external shape, and is arranged in contact with or closely to the entrance face 28Q of the illumination lens 28, as shown in FIG. 7. And the prism sheet 29 has a flat light irradiation face 29A at the white LED unit 26 side and a prism face 29B at the illumination lens 28 side.

As shown in FIG. 7, the prism face 29B has a reflecting face 29M having a comparatively steep gradient relative to the light irradiation face 29A and a transmitting face 29N having a comparatively gentle gradient relative to the light irradiation face 29A for example. The reflecting face 29M reflects the light, emitted from the blue LED unit 27, passing through the illumination lens 28 and being incident on it to the illumination lens 28 side. For example, it has a reflecting face 29M having a comparatively steep gradient relative to the light irradiation face 29A and a transmitting face 29N for transmitting the light emitted mainly from the white LED unit 26 to the illumination lens 28 side. The transmitting face 29N is inclined comparatively gently relative to the light irradiation face 29A.

Due to this prism sheet, a white light outputted from the white LED unit 26 and a blue light outputted from the blue LED unit 27 advance through the illumination lens 28 to the top end portion 28P and are outputted to the outside of the upper case 18.

As shown in FIG. 5, the light shielding holder 31 is formed out of a cap-shaped member having an opening 31A formed in the upper side of it and is pressed from above by the upper case 18, and accommodates inside it the white LED unit 26, the blue LED unit 27, the prism sheet 29 and the flange portion 28B of the illumination lens 28. The light shielding holder 31 prevents light outputted from the blue LED unit 27 or the white LED unit 26 from leaking out to the outside. The top end portion 28A of the illumination lens 28 is exposed from the opening 31A of the light shielding holder 31.

And the light shielding holder 31 is arranged on the printed wiring board 25 in a state where the illumination lens 28 is engaged by abutting the edge of the lower side of the opening 31A against the flange portion 28B of the illumination lens 28 and the upper face of the light shielding holder 31 abuts against the edge of the lower face side of the opening 18A of the upper case 18 and is pressed from above.

And a light shielding portion 31B having a specific height for preventing the white LED unit 26 from being directly irradiated with light from the blue LED unit 27 is provided on the printed wiring board 25 between the blue LED unit 27 and the illumination lens 28 inside the light shielding holder 31.

An operation portion 11 is provided on the folded-inside face of the lower case. The operation portion 11 is provided with a photographing mode key (not illustrated), a mail mode selection key, a talking mode selection key and a browser mode selection key. The photographing mode key selects a photographing mode of the camera and serves also as a shutter button. The mail mode selection key is used for preparing, transmitting or receiving an electronic mail. The browser mode selection key is used for activating a browser and browsing a home page. Additionally, the operation portion 11 is provided with a clear key for shifting from the photographing mode or the like to the waiting mode for displaying a waiting screen and waiting for some operation or an incoming call, a power key, a ten-key pad, a cursor key for moving the cursor on a display screen, and the like. And a mode switchover key 11A for switching over the display mode for performing a luminous incoming indication or an emblem illumination display and the strobe light emitting mode to each other is arranged on the upper end portion of the upper case 18 (see FIG. 4).

In this example, in case of performing a strobe light emission after the display mode has been switched over to the strobe light emitting mode by pressing the mode switchover key 11A, the display mode is automatically returned.

The main display portion 12A is arranged on the folded-inside face of the upper case 18 and is formed out of a transmission-type liquid crystal display device, for example, and displays the present time, an incoming notification and the like during non-photographing.

Next, the operation of a mobile telephone of an embodiment according to the present invention is described with reference to FIG. 6 and FIGS. 8 to 12.

First, an incoming notification function and an illumination display function are described.

After power is turned on, the control portion 3 comes into the waiting mode for waiting for an input operation by an operator or an incoming call, and makes the main display portion 12A display the waiting screen. When an incoming call comes in this state, the control portion 3 controls the LED driving portion 7 to blink each blue LED of the blue LED unit 27.

Figure 8:
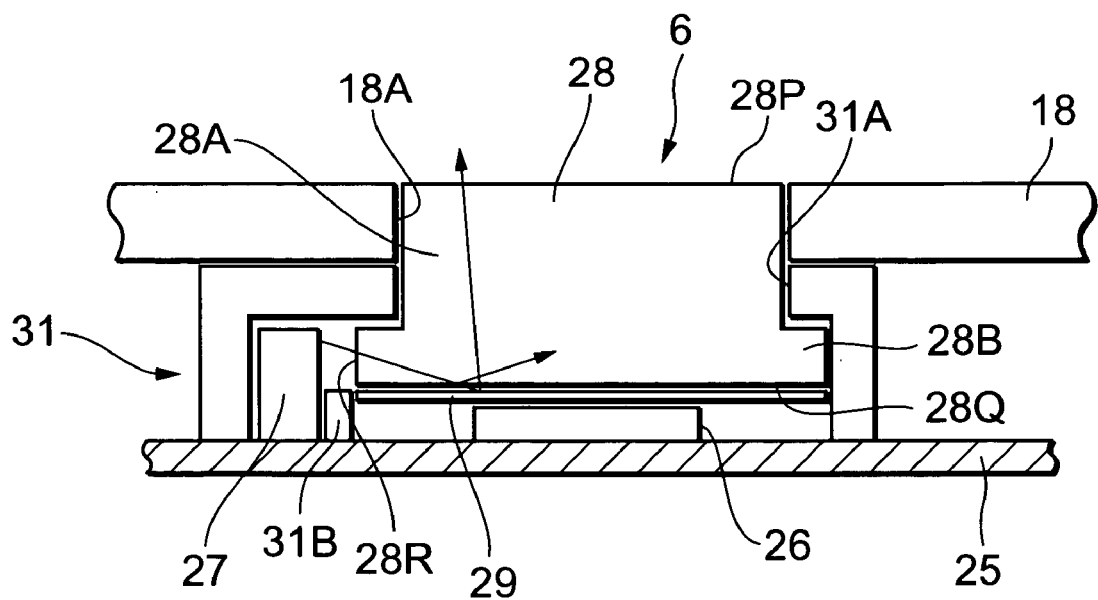
FIG. 8 is a sectional view of a light emitting portion for explaining the operation of a mobile telephone of the present invention.

As shown in FIG. 8, a blue light emitted from the blue LED unit 27 enters the side face 28R of the illumination lens 28 and a part of the light passing through the illumination lens 28 is reflected by the entrance face 28Q and advances to the opening 18A side and another part of the light is refracted and outputted toward the prism sheet 29.

Figure 9:
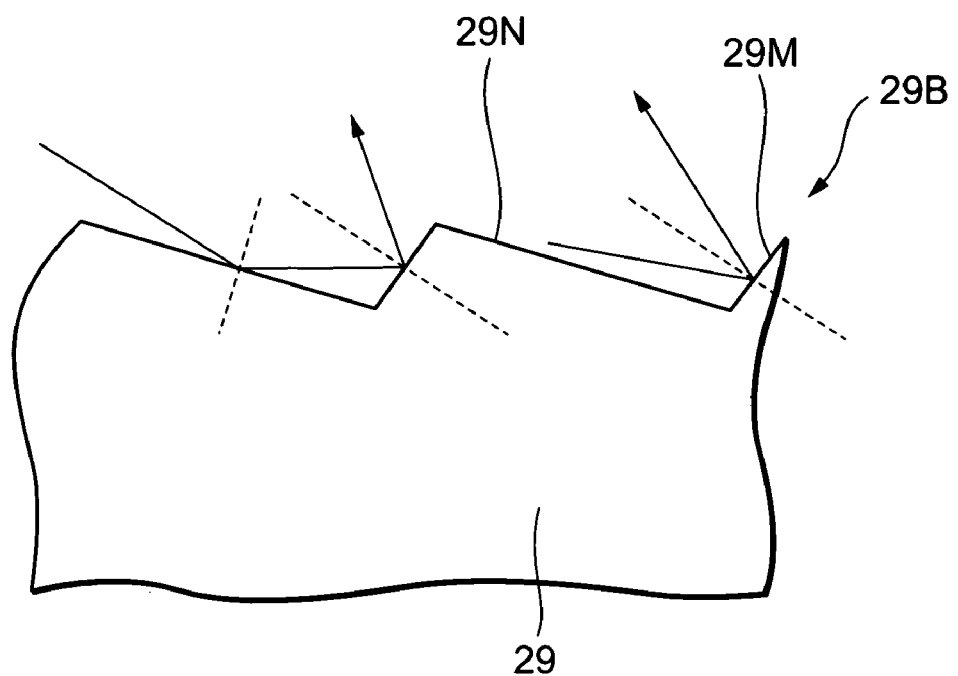
FIG. 9 is a sectional view of a prism sheet for explaining the operation of a mobile telephone of the present invention.

As shown in FIG. 9, a part of the light reaching the prism sheet 29 is reflected by the reflecting face 29M toward the illumination lens 28 or is reflected once by the transmitting face 29N toward the reflecting face 29M and thereafter reflected by the reflecting face 29M toward the illumination lens 28, and another part of it is transmitted into the prism sheet 29.

The blue light which has entered the illumination lens 28 through the entrance face 28Q and passed through the illumination lens 28 is outputted from the exit face 28P.

Figure 10:
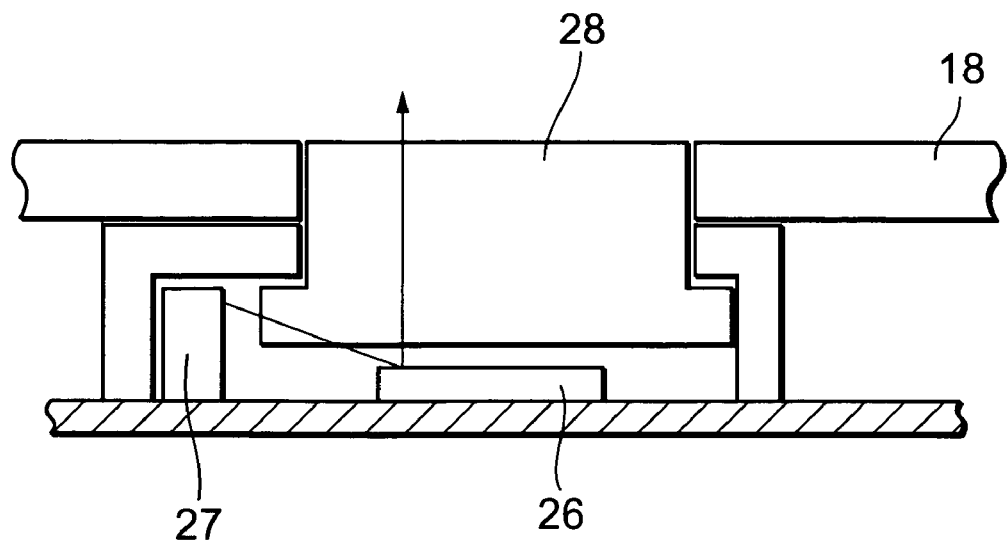
FIG. 10 is a sectional view of a light emitting portion for explaining the operation of the light emitting portion of a mobile telephone of the present invention in case that the prism sheet is removed.

Hereupon, a problem in case of removing the prism sheet 29 from the light emitting portion 6 of a mobile telephone of an embodiment of the present invention is described with reference to FIG. 10. As shown in FIG. 10, a blue light emitted from the blue LED unit 27 enters the side face 28R of the illumination lens 28, passes through the illumination lens 28 and enters the white LED unit 26. As described above, a fluorescent plate mixed with a yellow fluorescent material is arranged at the illumination lens 28 side of the white LED unit 26 and a white light is emitted from the fluorescent plate by irradiating the yellow fluorescent material with a blue light even if the white LED unit 26 is not driven. This white light passes through the illumination lens 28 and exits from the opening 18A. Due to this, there occurs a phenomenon being undesired from the viewpoint of fine appearance that a white area looming in a blue area is visually perceived.

In a mobile telephone of the present invention, by interposing the prism sheet 29 between the illumination lens 28 and the white LED unit 26, a blue light reaching the white LED unit 26 is made as small as negligible and the emission of white light being unwanted in quality of display is suppressed.

And in this example, during conversation the control portion 3 controls the LED driving portion 7 to blink each blue LED of the blue LED unit 27 and thereby enables the emblem to perform illumination display.

Next, the strobe light emitting function is described.

When an operator presses the mode switchover key 11A to select the photographing mode in order to switch over an operation mode in a state where the waiting screen is displayed on the main display portion 12A, the operation mode is switched over to the photographing mode.

The control portion 3 makes the main display portion 12A display a subject in front of the camera lens 22 and display a message that the camera is in the photographing standby state at present and is capable of photographing by pressing the mode switchover key 11A again.

Hereupon, in case that the operator feels insufficiency in brightness and presses the mode switchover key 11A, the camera shifts from the display mode to the strobe light emitting mode.

After the operator has determined a photographing composition and confirmed the range of photographing and the like, the operator presses the mode switchover key 11A again. By this operation, a strobe light emission is performed and a photographed image is taken in.

That is to say, the control portion 3 controls the LED driving portion 7 to make the blue LED's of the white LED unit 26 emit light.

Figure 11:
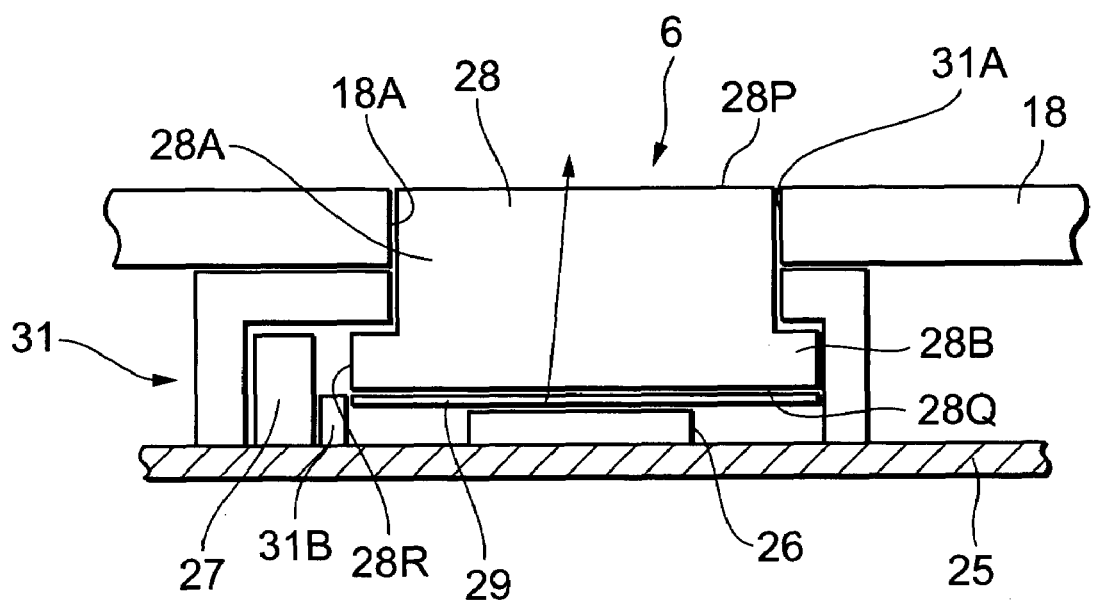
FIG. 11 is a sectional view of a light emitting portion for explaining the operation of a mobile telephone of the present invention.

A blue light outputted from the blue LED's of the white LED unit 26 is irradiated to the yellow fluorescent material of the fluorescent plate and as shown in FIG. 11, due to an additive mixture a white light is outputted from the white LED unit 26 and is irradiated to the prism sheet 29.

Figure 12:
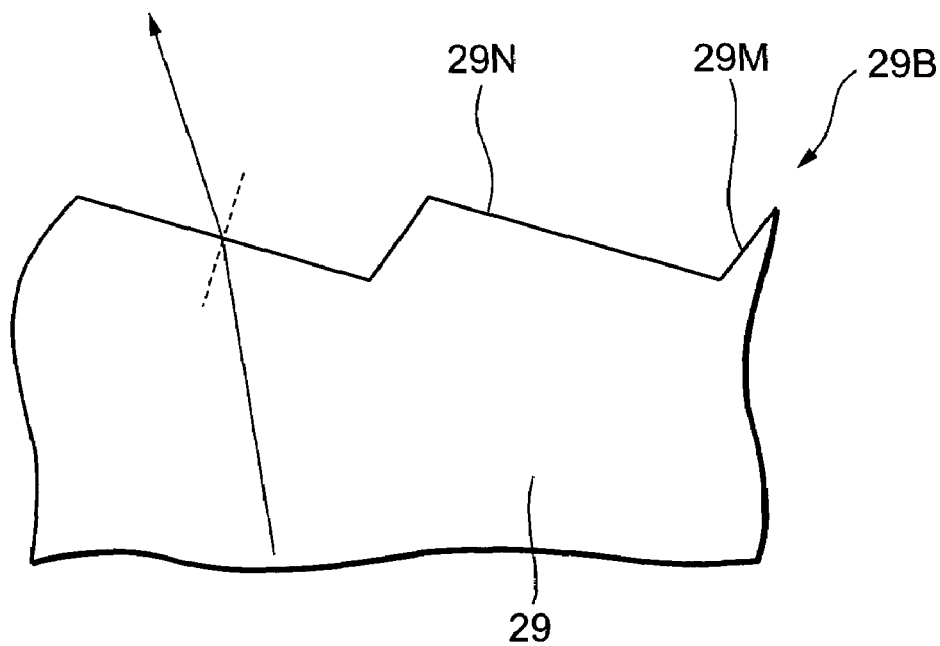
FIG. 12 is a magnified sectional view of a prism sheet for explaining the operation of a mobile telephone of the present invention.

A part of the white light outputted from the white LED unit 26 enters the light irradiation face 29A of the prism sheet 29 as shown in FIG. 11 and then reaches the transmitting face 29N as shown in FIG. 12, and a part of the light is refracted and outputted toward the illumination lens 28 and another part of it is reflected. And a part of the white light outputted from the white LED unit 26 reaches the reflecting face 29M and a part of it is refracted and outputted toward the illumination lens 28, and another part of it is reflected.

The white light which has entered the illumination lens 28 from the entrance face 28Q passes through the illumination lens 28, is outputted to the outside of the upper case 18 and is used as a strobe light.

When the control portion 3 receives image data obtained by photographing from the image processing portion 23, it stores the image data into the storage portion 4 and provides the main display portion 12A with a specific display signal on the basis of the image data and makes the main display portion 12A display a corresponding image.

After this, for example, in case that the operator transmits an electronic mail having an image of a photographed print attached to it to another person's mobile telephone and the like, the operator presses the mail mode selection key of the operation portion 11 to bring the mail mode and performs a transmission operation. By this the control portion 3 transmits image data obtained by photographing to a mobile telephone and the like specified by the operator through the wireless communication portion 9.

According to the composition of this example, by sharing the same illumination lens 28 in the light emitting portion 6, it is possible to realize an incoming notification function for notifying a user of an incoming call when the incoming call has come, an illumination display function for illumination-displaying a specific emblem and a strobe light emitting function for emitting a strobe light according to necessity at the time of photographing. A mobile telephone of the present invention does not need to be provided with separate lenses for illumination display and for strobe light emission as in the prior art. Due to this, a mobile telephone of the present invention can suppress the increase in number of parts, realize multi-functionality and further reduce the accommodating space inside the case and can be made light in weight.

In a mobile telephone of the present invention, by interposing the prism sheet 29 between the illumination lens 28 and the white LED unit 26, a blue light reaching the white LED unit 26 at the time of illumination display is made as small as negligible and the emission of white light being unwanted in quality of display can be suppressed.

As described above, although an embodiment of the present invention has been described in detail with reference to the drawings, a concrete composition is not limited to this embodiment but variations and the like in design within the scope not departing from the purport of the invention are included in the present invention.

For example, although in the above-mentioned embodiment the case of using a mobile telephone as a portable electronic device has been described, the invention is not limited to a mobile telephone but can provide almost the same effect as the case of a mobile telephone also in case of a personal handy-phone system (PHS) terminal or a personal digital assistant (PDA) having a wireless communication function.

And the present invention can be applied also to a device not necessarily having a wireless communication function and to a digital camera and particularly to a wristwatch-type digital camera. And it may also be applied to a notebook-sized personal computer having a camera built in it.

And a mobile telephone may not necessarily be a foldable mobile telephone.

And it is also acceptable to make a structure in which at least one set of a red LED, a green LED and a blue LED is arranged emit a white light instead of using the white LED unit 26. In this case, the prism sheet 29 may be omitted. And as a second light source, for example, a red LED or a green LED may be used instead of a blue LED.

And in a blue LED unit, a light emitting diode for emitting a mixed-color light of blue and another color may be used instead of a blue LED.

A blue LED driving circuit in an LED driving circuit may be a circuit for simply connecting a blue LED to a power source or a circuit having a booster circuit or further a circuit having a capacitor connected in parallel with a blue LED.

In case that a sufficient brightness can be obtained, an illumination lens may be omitted.

And it is also acceptable to arrange a white LED unit opposite to the side face 28R of the illumination lens 28 and arrange a blue LED unit opposite to the entrance face 28Q of the illumination lens 28. In this case a prism sheet is interposed between the white LED unit and the side face 28R.

And the inner wall faces of the light shielding holder 31 or the inner wall faces of the case 2 which a white light or a blue light can reach may be colored in white, silver or the like. In this case the quantity of white light or blue light is increased by being reflected by the surfaces of the light shielding holder 31 and the like and the effect of a strobe light emitting function and an illumination display function is increased.

And a diffusing sheet having an inorganic or organic material for diffusing light mixed in a base material of resin may be provided instead of the prism sheet 29 to be used as a light diffusing means. The diffusing sheet diffuses and outputs an inputted light. A means having a similar light diffusing function may be used instead of the prism sheet 29 or a diffusing sheet.

And it is also acceptable to mix a light diffusing agent in the illumination lens 28 and thereby forcibly diffuse a blue light inputted into only a part of the illumination lens 28 into the whole illumination lens 28 and increase the effect of outputting the blue light.

And a light source is not limited to an LED but may be any other device emitting a blue light or a white light such as an EL (electroluminescent) display device or the like, or may be a combination of a fluorescent lamp with a filter.

And although in the above-mentioned embodiment the case that a liquid crystal display device is used as a display device to be used in a display portion has been described, it is not limited to this but may use an EL display device for example. And a plasma display may be used.

And although in the above-mentioned embodiment the case of transmitting a static image photographed by an electronic camera unit has been described, the said mobile telephone may be used as a TV phone.

And a fixed camera lens is not limited to a standard lens. And a plurality of camera lenses may be selectively used. And an electronic camera unit may be provided with an electronic zooming function.

And although a photographing mode key is made to serve also as a shutter button, a dedicated shutter button may be provided independently on the upper end portion of the upper case 18 for example.

And although photographing is performed by pressing twice the mode switchover key, photographing may be performed after a certain time by being provided with a self-timer.

And a photographing window 21 and a camera lens 22 of an electronic camera unit 5 may be provided in the folded-inside face of the upper case 18 of a mobile telephone.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. A mobile telephone with a camera, comprising:
   a camera portion;
   a first light source for outputting white light as a strobe light emitting operation in connection with a photographing operation of said camera portion;
   a second light source for outputting non-white light for display of incoming indication; and
   a lens for outputting said white light and said non-white light to the outside therethrough, wherein said lens is provided with a first entrance face through which said white light comes in, a second entrance face through which said non-white light comes in and a common exit face opposite to said first entrance face to output said white light and said non-white light therethrough while said first entrance face and said second entrance face are on different planes crossing to each other,
   wherein a light diffusing sheet is provided in contact with or adjacently to either of said first entrance face and said second entrance face of said lens,
   wherein said white light outputted from said first light source is inputted into said first entrance face of said lens through said light diffusing sheet and is outputted from said common exit face of said lens to the outside, and
   wherein said non-white light outputted from said second light source is inputted into said second entrance face of said lens, is reflected and diffused by said light diffusing sheet and is outputted from said common exit face of said lens to the outside.

2. A mobile telephone with a camera according to claim 1, wherein said second light source is used for illumination display during conversation.

3. A mobile telephone with a camera according to claim 1, wherein said light diffusing sheet is a sheet selected from a group consisting of a prism sheet and a diffusing sheet.

4. A mobile telephone with a camera according to claim 1, wherein said first light source and said second light source each are provided with a light emitting diode.

5. A mobile telephone with a camera according to claim 1, wherein said first light source is provided with a white light emitting diode.

6. A mobile telephone with a camera according to claim 1, wherein said second light source is provided with a blue light emitting diode.

* * * * *